INVENTOR.
Walter L. Fleisher
BY Kenyon & Kenyon
ATTORNEYS.

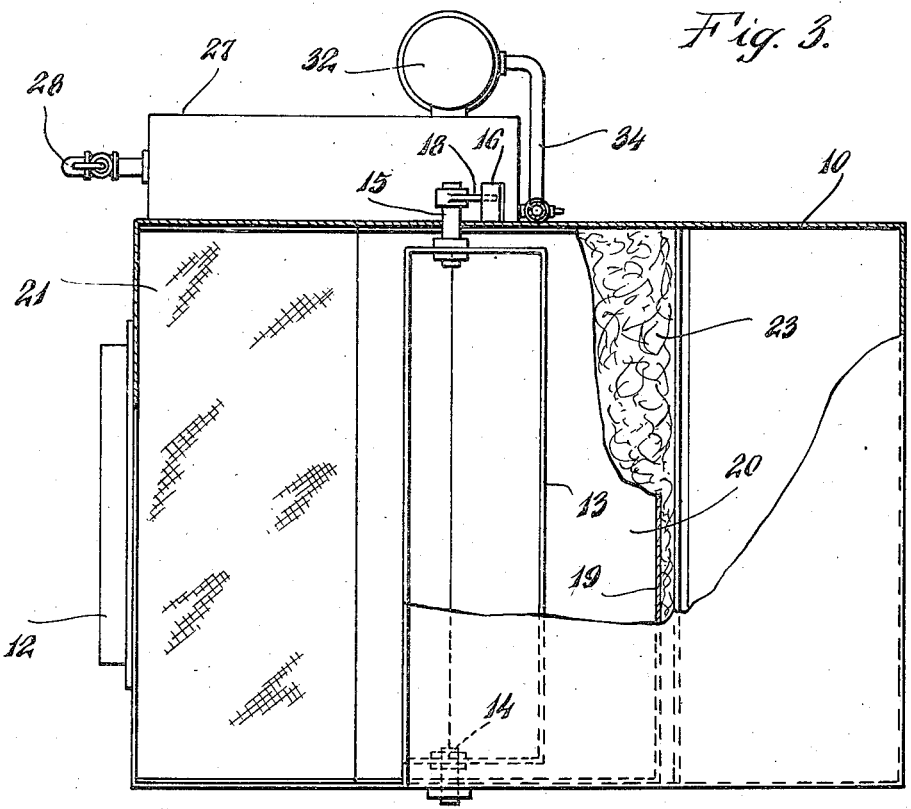
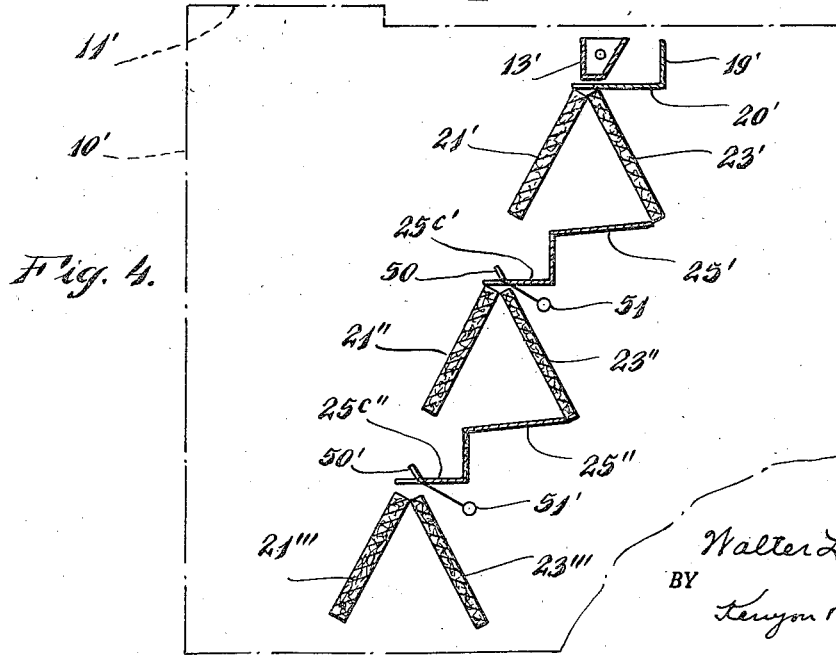

Patented Nov. 25, 1947

2,431,389

UNITED STATES PATENT OFFICE 2,431,389

APPARATUS FOR HUMIDIFYING AND CLEANING GASEOUS FLUIDS SUCH AS AIR

Walter L. Fleisher, New City, N. Y.

Application September 25, 1945, Serial No. 618,438

6 Claims. (Cl. 183—13)

This invention relates to means for obtaining intermittent humidification with constant cleaning of air or other gas and for preventing entrainment of droplets or bubbles of the conditioning medium in the gas leaving the conditioner. The apparatus is primarily for wintertime conditioning of houses and other enclosures.

When water, or a combination of water and a viscous fluid such as triethylene glycol, is dumped periodically over the upper part of a sloping filter screen such as a glass filament filter, where purposefully certain portions of the liquid flow down the filter or screen for cleaning purposes and other portions pass through the filter or screen for wetting and partial humidification of the gas passing therethrough, some of the liquid, because of its viscosity and surface tension tends to form itself into minute spheres in the nature of tiny hollow bubbles. These bubbles being very light, are carried along in the air stream and are not taken out by conventional eliminators or hooks, which are commonly an integral part of a washer or scrubber eliminator, and where the specific gravity of the ordinary water droplets is sufficient for the velocity of discharge to throw the droplets against the surfaces of the eliminator plates. With the tiny viscous bubbles which are developed with a solution such as the solution herein described, there is no tendency for the bubbles to be thrown out of the air stream and consequently a screen having only the finest interstices (such as the filter screen described in Patent No. 2,356,757 or one of similar construction) is effective for the purpose, and even a screen such as this, unless set at the angle herein described, will not effectively remove these bubbles, which are not in the nature of an evaporated vapor.

A principal object of my invention is to provide means for effectively eliminating such bubbles or droplets from the gas stream emerging from the device, and only allowing vapors to pass along with the air stream itself.

In the case, for example, where the filter screens are similar to that disclosed in my U. S. Patent No. 2,356,757 or in my co-pending application Ser. No. 549,668, filed Aug. 16, 1944, or with other filter screens, I have discovered that if a second screen similar in principle to the original filter screen or filter is installed at an angle facing the original screen and approximately at the same angle, the two forming an inverted V, the small bubbles or droplets which ordinarily would be carried over and emitted with the gaseous stream, are eliminated. These small bubbles or droplets are either broken into such small shattered fragments that they attach themselves to and follow the slope of the eliminating screens and are thus carried to the bottom of the screen and to the collecting pan, or else, by the eddy set up by the action of the gas or air stream, because of the angular position of the eliminating screen, are deflected back into the liquid in the collecting pan and thence drained into the liquid medium in the tank.

The velocity of the gas or air stream striking the eliminating screen is of major importance. At the top of this screen where the gas velocity is greatest, because the distance between the leaving surface of the filter is closest to the entering surface of the leaving eliminator, the eddies created are so strong that they have a tendency to immediately carry the drops or bubbles floating in the gas or air stream away from the entering face of the eliminator to prevent the bubbles or drops from even coming in contact with said face. Also, due to the velocity over this upper surface, I have discovered that an induced current is developed which has a tendency to keep these droplets away from the surface of the leaving screen until they can be absorbed or deflected. In the lower portion of the leaving screen or eliminator where the velocity of approaching gas or air is less, the bubbles or droplets have an opportunity to settle and cling to the face of the eliminator screen, and are then by gravity or gas or air movement carried to the bottom of the screen and then carried off to the collecting pan.

If the eliminator screen were not disposed angularly as indicated, namely, so that it and the filter screen form an inverted V, the structure in section approximating an isosceles triangle with the top apex angle not exceeding 60 degrees, the tendency would be for the droplets to settle on the eliminator screen. They then would eventually work themselves through the latter to again be carried by the emerging air or gas stream as unvaporized droplets. The latter would then become deposited on walls, furniture and ceilings and throughout the ducts and associated apparatus. It is extremely important that this should not occur because the viscous or controlling liquid is expensive and its loss by deposit would require replacement. Moreover, this deposited material would create an undesirable sticky scum on the walls, furniture, ceilings, ducts and associated apparatus. Although these droplets are minute in their individual entities, they constitute a far greater weight of the viscous material than is actually evaporated and purposefully carried through the leaving screen with the air stream. Consequently, although there is some danger of the vaporized solution eventually depositing out, it is so minute that it is of no importance, but, if the droplets escape or have a tendency to escape, the effect would be undesirable. Except in true vapor form, none of the conditioning liquid must leave the apparatus.

Another principal object of this invention therefore is to provide structure meeting the requirements of eliminating scum and loss.

A further object of the invention is to provide simple and effective means for meeting these requirements.

Another principal object of the invention is to provide improved means for securing evenness of flow of the conditioning liquid to the filtering screen so that uniformity of flow of such liquid over the filtering screen is obtained.

To the accomplishment of the foregoing and such other objects as may hereinafter appear, this invention consists in the novel construction and arrangement of parts, hereinafter to be described in detail and then sought to be defined in the appended claims, reference being had to the accompanying drawing forming a part hereof which shows, merely for the purposes of illustrative disclosure, preferred embodiments of the invention, it being expressly understood, however, that changes may be made in practice within the scope of the claims without digressing from the inventive idea.

In the drawing:

Fig. 3 is a transverse section taken along line 3—3 of Fig. 1; and

Fig. 4 is a diagrammatic sectional elevation of a modified form of construction.

Figure 1:
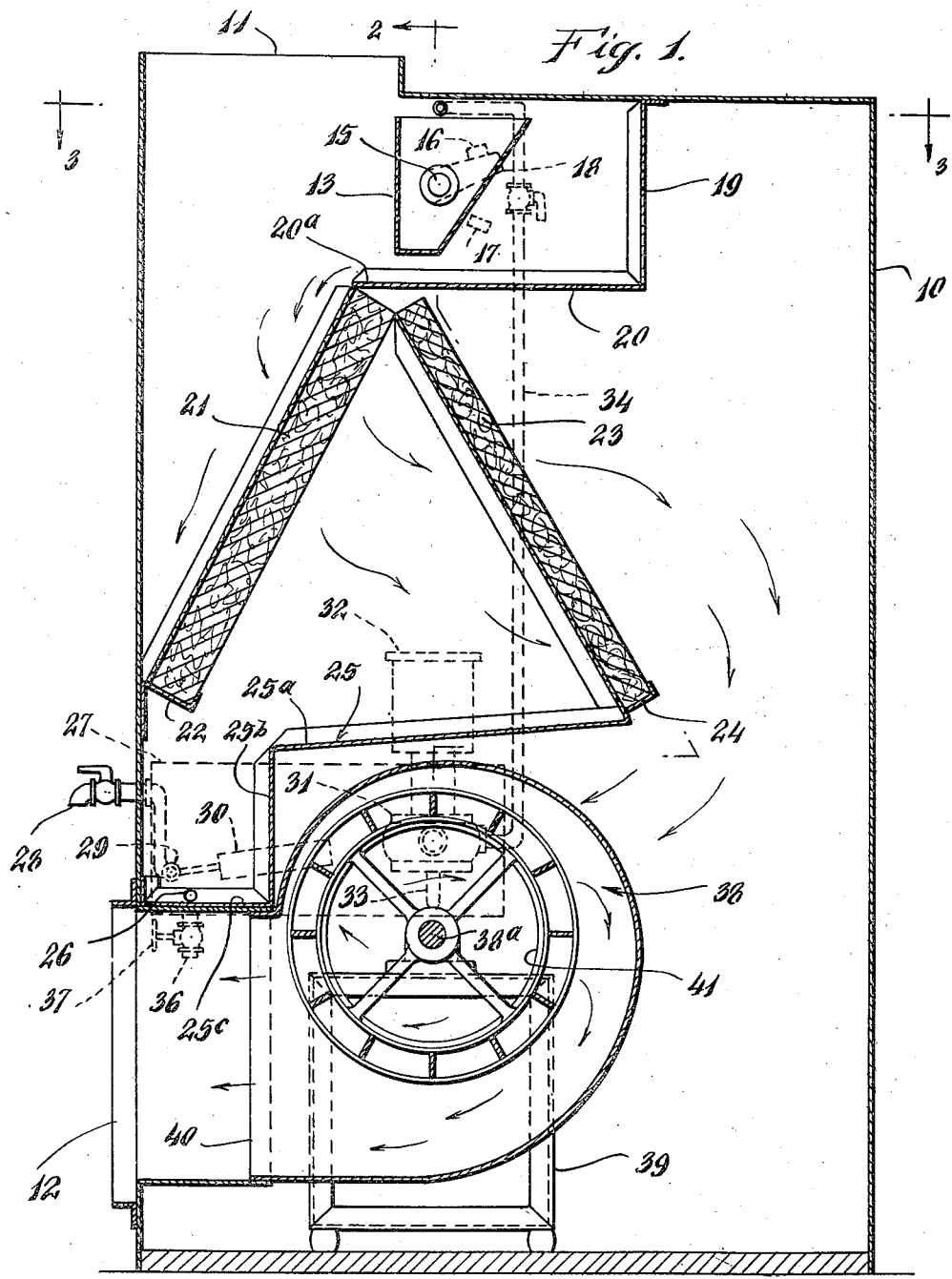
Fig. 1 is a sectional elevation taken along line 1—1 of Fig. 2.

Referring to the drawing, 10 denotes a casing of suitable material that is provided with a gas or air inlet opening 11, preferably in its top, and a gas or air discharge opening 12 in one of its sides at the lower portion thereof.

A water trough or dumping pan 13, preferably of trapezoidal section is loosely pivoted on shafts 14, 15 between sides of the casing 10, so as to dump or tilt under the weight of a predetermined amount of liquid therein in the clockwise direction of Fig. 1. Suitable abutments 16, 17 extending from the face of casing 10, restrict or limit the rotary movement of a crank lever 18 fixed suitably to the pivot shaft 15. The limit stops 16, 17 are fitted with rubber or other sound-deadening material so that in making the dump and returning to normal position the sound of metal to metal between lever 18 and stops 16, 17, is eliminated. These stops prevent over-travel of the dumping pan 13 during dumping of its contents so that it will always return automatically to the normal position shown in Fig. 1 after being emptied. In the embodiment shown, the dump tank 13 is adapted to dump when approximately two gallons of liquid have been delivered to it. This amount, however, is subject to variation as desired.

When the pan 13 is filled to its dumping capacity, it tilts in the clockwise direction of Fig. 1 and delivers its contents so that they strike a baffle plate 19 whence they fall upon the slightly sloping pan 20. In the embodiment shown, the slope of pan 20 is approximately ¾" per foot. Both the baffle plate 19 and sloping pan 20 are suspended suitably within the casing 10. The distance between the baffle plate 19 and the discharge edge 20a of the sloping pan 20 is so admeasured and the time required for the dumped liquid after it strikes baffle plate 19 to reach the discharge edge 20a is sufficient in relation to the viscosity of the dumped fluid to eliminate unevennesses of flow due to impact of the liquid upon the pan 20, so that substantially absolute uniformity of flow of such liquid over the discharge edge 20a is effected.

A screen or filter cell 21 is suspended angularly within the container or casing 10 at approximately 60° with the horizontal. The upper edge of this screen or filter cell 21 is positioned to lie directly below the discharge edge 20a of sloping pan 20. The lower edge of the cell 21 extends downwardly and forwardly of its upper edge and rests, for example, on the bracket 22 supported from the casing 10 so as to maintain the desired angular disposition of said cell. This cell 21, for example, has the construction of the cell of my aforementioned Patent 2,356,757, granted August 29, 1944, or may have other suitable construction.

A second cell 23 is suspended within the casing 10 so that it and the cell 21 in section have the appearance of an inverted V. To this end, the upper edge of cell 23 lies adjacent the upper edge of cell 22, while its lower edge extends forwardly and downwardly and rests, for example, on the bracket 24 supported from the casing 10 and disposed to maintain the angular disposition of cell 23 with respect to cell 21 so that the top or apex angle between the two screens 21 and 23 does not exceed 60°. The cell 23 is preferably of similar construction to that of cell 21, although it need not be as thick. It also may have other construction if desired.

A collecting member or pan 25 is secured suitably to the bracket 24. This pan extends the full width of casing 10 between its side walls and has a downwardly sloping portion 25a, a substantially vertical portion 25b and a collecting or sump portion 25c for a purpose to be presently described. This pan 25 also serves as a partitioning member or baffle to force the flow of gas or air from the inlet 11 through the cells or screens 21 and 23.

The collecting or sump portion 25c slopes downwardly toward one of the side walls of the casing 10 to a drain outlet 26 that delivers the collected fluid to a tank 27 supported suitably from the casing 10.

This tank 27 in the embodiment shown has a capacity of approximately five gallons, that is, a larger capacity than is required for normal wintertime operation for reasons that will be presently described.

A suitable inlet conduit 28 is connected to a source of water supply (not shown) and the delivery of water to the tank 27 from said conduit is controlled by any conventional float operated valve 29 whose float 30, in the embodiment shown is positioned permanently to cut off water supply to the tank 27 as long as its contents remain above a certain amount to be described. A pump 31 of conventional form, driven by a motor 32 is connected with the tank by conduit 33. The delivery conduit 34 of the pump extends upwardly from the pump, terminating in a nozzle 35 overlying the dump bucket 13 so that the liquid pumped from tank 27 is delivered to the said dump bucket or trough 13. If desired, conventional electric circuit connections can be provided to halt operation of the pump while bucket 13 is dumping although this is not essential to successful operation. A conventional drain outlet 36, normally closed by a valve 37 serves to remove the fluid from tank 27 for cleaning thereof or replacement.

The air to be conditioned is circulated by means of a suitable fan 38. This fan is positioned within the casing 10 on a frame 39 so that its discharge outlet 40 discharges air or gas through opening 12 in said casing. The suction inlets 41 of the fan open into the casing 10 so as to draw air or gas from casing inlet 11 through the cells 21 and 23 in the general path indicated by the arrows A of Fig. 1. The fan 38 is driven in conventional manner, for example, by a motor 42 coupled by belting 43 to a sheave 44 on the fan shaft 38a.

In a system of air ventilation, where the air is carried through a filter, cell or screen, as screen 21 which is wetted continuously or intermittently by liquid, preferably water, dumping over the top of the screen and flowing down the screen, or in a capillary cell, with the unevaporated water wasting to the sewer, one of two things is likely to occur. Either too much water is evaporated and too high a relative humidity occurs in the enclosure to which the air is directed, or, if the water is fed to the tilting pan 13 or other means of intermittent water flow very slowly so that wetting of the screen or cell 21 occurs only once or twice an hour, which is all that is ordinarily required for humidification of a well constructed house, the cell or screen is dry for such a length of time, that either the very loosely packed filaments of the capillary cell or the screens whose interstices are small compared to the size of the bubbles and that are relatively large when compared with the average dust particle no longer act as good dust eliminators or collectors, due to the fact that they are dry and untreated with adhesive or other compositions, such as are generally used in dry filters to collect the dust.

To overcome this condition and to effect additional results, I utilize in combination, a solution of triethylene glycol and water or other solutions or emulsion, of which water is the lesser part, to effect the wetting of a slanting cell or screen 21; the wetting being effected by means of the tilting or unbalanced pan or bucket 13, or other suitable equipment located above the screen 21.

In a household filter and humidifying apparatus supplying for example 1300 cubic feet per minute, I have discovered that for thorough washing and wetting of my filter cell or screen 21 and proper wintertime humidification, at least two gallons of solution must be dumped over a cell or screen if it is about 25″ in length and 20″ wide in order to accomplish the thorough scrubbing which is essential for the removal of the dirt reposing on the screen due to the passage of air. If this liquid is only water, the evaporation due to one or two dumps of two gallons per dump is sufficient for humidification purposes; but as all water reposing on the screens or strands thereof is completely evaporated in a period of less than four minutes, as a dust arrester the cell or screen is only efficient for a very small portion of the total operating period. However, I have discovered that a solution of about 60% to 80% triethylene glycol and 40% to 20% water or other proportions of solutions or emulsions having similar characteristics, which are listed in the paragraph below, when dumped from my tilting pan 13, will deposit a solution on my screen 21 which is sufficient to give about a 40% relative humidity in the wintertime without the danger of over-saturation; while the viscosity of the solution or emulsion is sufficient to coat the cell filaments for a sufficient length of time so that the coated strands act as dust collectors during the non-flushing period of the intermittent flushing cycle and so that when flushing does occur during the prescribed cycle, sufficient aqueous solution is dumped over the cell strands or screen filaments to wash the solution clinging to the strands into the collecting pan or sump 25c and still enough evaporation of water takes place to create the required wintertime humidification.

Other solutions or emulsions having similar characteristics that may be used as alternatives for triethylene glycol are glycerine and water, or any of the glycerine derivatives, or similar combinations entirely miscible with water and that have no tendency to harden or crystallize on the filter strands. The percentages of these substances with water will be proportional to the vapor pressures of the basic substances and the vapor pressures of the substances should be low so that their dew points are not below the lowest dew point carried in the enclosures which would tend to deposit out the basic substances on surrounding walls, etc., causing a feeling of stickiness. In other words such substances are those that are absorbers but are not readily vaporized. They will exhibit the characteristics pointed out in the preceding paragraph as to triethylene glycol and water solution.

Because of the cost of the viscous solution, it is essential to conserve and re-use the solution for an indefinite period of time. Consequently, the solution which is dumped over the sloping cell or screen is collected on the sloping plate 25a and in sump 25c underneath the screen and drained into the tank 27. This tank 27 must be designed in accordance with this invention to hold from one-and-a-half to twice the volume of the basic viscous liquid—that is, the triethylene glycol or similar liquid chemical. This is an extremely important aspect of this invention. The importance can be understood from a consideration of the operations resulting from use of the apparatus.

If the dumping pan 13 or similar equipment holds two gallons essential for proper flushing of the cell or screen 21, then for winter use the tank 27 must hold at least four gallons of solution so that two gallons can be drawn by pump 31 from this tank and discharged into the dumping pan 13 through conduit 34 and discharge nozzle 35. In the tank 27 which contains the total volume of solution, the float 30 is positioned to cut off water delivery at the level of the remainder left in the tank 27 after the dumping volume (two gallons in this embodiment) is withdrawn. If water is evaporated during the period after a dump, then on the next filling of the dumping tank 13, the level remaining in the tank 27 will be reduced below the cut-off level of the float 30 and water will flow into the tank 27 to replace the evaporated water. As the chemical, such as triethylene glycol or similar viscous material, is minute in its evaporative characteristics, the diminution in the height of liquid in the tank 27 is due primarily to the evaporation of water, and consequently the introduction of additional water when the valve 29 opens maintains the concentration in the solution at the right percentages to maintain the relative humidities indicated. The valve 29 of course closes as soon as the float 30 rises to its cut-off level.

On the other hand, in the summertime, or when the dry bulb temperatures rise, the solution of triethylene glycol and water, or similar solutions, tends to become a dehydrator, the vapor pressure of the solution changing and water being absorbed by the solution rather than evaporation taking place from the cell or screen 21. In such periods, water will be taken up by the triethylene glycol in solution until a different or weaker concentration is developed so that with normal conditions of atmospheric pressure, existing, for instance, in the United States, possibly twice as much water with the same amount of triethylene glycol or similar solution will be deposited in the tank 27. In order to prevent the overflow of solution and the loss of the expensive material, the tank 27 must be designed for, say, five gallons instead of the four which is its normal operating volume in wintertime. However, as the float control valve 29 is set permanently at the winter level, the summertime level in the tank 27 always remains above the cut-off level of the float 39 and no additional water will be supplied to the solution during this period. In this way, by having the tank 27 designed for the variation in the vapor pressure characteristics of the particular solution, definite humidities can be maintained during the artificially created heating season, and safety factors for the saving of the solution can be maintained during the free or mild season. In this way the simplest type of control of humidity is maintained over a wide period of the year without thermostatically sensitive instruments, which respond to the moisture content of the air.

As a small amount of the triethylene glycol will be evaporated, from time to time the strength of the solution should be tested with a hydrometer, and the amount of triethylene glycol or similar solution which has been evaporated should be replaced to bring about the normal conditions for operation and humidification. Ordinarily, a test every two or three months will be sufficient.

If the concentration of the solution has been found to show only a slight decrease due to the slight evaporation of the triethylene glycol or equivalent substance, chemical replacement can be avoided by making only a slight change in the cut-off setting of the float valve 29. Thus it is possible to utilize the apparatus for long periods of time without requiring any replacement of chemical. The actual need for replacement will show up in increased humidity in the air treated.

Normally, the amount of solution which has to be pumped into the tilting pan 13 is of the nature of one-seventh to one-tenth of a gallon per minute in the embodiment shown. Consequently, any small, even inefficient pumping arrangement will supply the necessary flushing action without any appreciable loss in overall efficiency.

The equipment described lends itself, by the very nature of the characteristics of the solution, to cooling as well as humidification, for when major evaporative cooling is required the supplementary tank 27 can be made still larger in capacity and the strength of the solution reduced to allow of greater evaporation. It is important to bear in mind the two following fundamental characteristics of this invention; although with triethylene glycol and water a perfect solution is obtained, the viscosity of the triethylene glycol holds to the strands of the cell or screen, irrespective of the evaporation or flow of the liquid, and it has the ability of the viscous material to cling during the off period of dumping which creates the cleaning which is so essential in the non-dumping period. Moreover, the triethylene glycol or other chemical used not only has the ability of clinging to the strands but of remaining viscous. The nature of the basic substance being an absorber and taking a condition of equilibrium with the vapor pressure of the moisture of the air coming in contact with it, it will pick up a very slight amount of moisture from the air as the glycol or similar substance tends to dry out and then it has reached an equilibrium it will give up a tiny amount of moisture again to always maintain an equilibrium. In this way without affecting in any material way the condition of the leaving air it remains in a state to pick up the dust throughout the off period and consequently is in itself sufficiently unset to be washed off with its clinging dust particles during the flushing period. This property is of great importance because it is apparent that cleaning is enhanced by a substance which retains its viscosity.

As has been stated at the outset of this specification, because of its viscosity and surface tension, some of the liquid, tends to form itself into minute spheres, in the nature of tiny hollow bubbles, that are carried along by the air or gas stream flowing through filter screen 21. However, these bubbles or drops are eliminated effectively by the second or eliminator screen 23. These small bubbles or droplets are either broken into such small, shattered fragments by the screen 23 that they attach themselves to and follow the slope of the said eliminating screen 23 and are thus carried to its bottom and fall onto the collecting pan 25, or else by the eddy set up in the space formed by the screens 21 and 23, because of the angular position of the eliminating screen 23 are deflected directly into the collecting pan 25 and drained into the liiquid medium in tank 27. The ordinary eliminator with hooks has a free area of anywhere from $\frac{1}{2}''$ to $1\frac{1}{2}''$, and the only reason droplets are caught is due to the change of direction of the airflow. The droplets, for instance, of water, having a greater density than the air, project themselves into the hooked spaces. As the droplets of the viscous material are probably not over $\frac{1}{10}''$ in diameter, of course they would not be affected by the ordinary eliminators but would float through the spaces through which the air passes without being projected into the hooked receiving spaces.

The velocity of the gas or air stream striking the eliminating screen 23 is of major importance. At the top of this screen where its entering surface is closest to the leaving surface of the filter 21, the air or gas velocity is greatest and the eddies created are so strong that they have a tendency to immediately carry the drops or bubbles floating in the air or gas stream emerging from the leaving surface of filter 21 away from the entering face of the eliminator screen 23 to prevent the bubbles or drops from even coming in contact with said face. At the lower portion of the eliminator screen, where the velocity of the approaching gas or air is less, because of greater distance from the leaving surface of filter screen 21, the bubbles or droplets in the air approaching the entering surface of the eliminator screen have an opportunity to settle and cling to such entering face. Then by gravity, or by gas or air movement, such drops or bubbles are carried to the bottom of the screen 23 and are then moved off onto the collecting pan 25 and thence to tank 27.

The angular disposition of the eliminator screen 23 so that it with the filter screen 21 forms an inverted V whose apex angle does not exceed 60° is of utmost importance. Unless such construction is utilized the tendency would be for the drops or bubbles to settle on the eliminator screen 23 and eventually work themselves through the latter to again be carried in the air or gas stream delivered through outlet 12, there appearing as unvaporized droplets which would eventually cover walls of the enclosure conditioned with a sticky scum. The eliminator screen 23 and its arrangement relative to filter screen 21 obviates such an occurrence. Only a very small part of the viscous material of the conditioning liquid is vaporized which either is not noticeable or is eliminated by the ordinary exfiltration of air from the enclosure.

Figure 2:
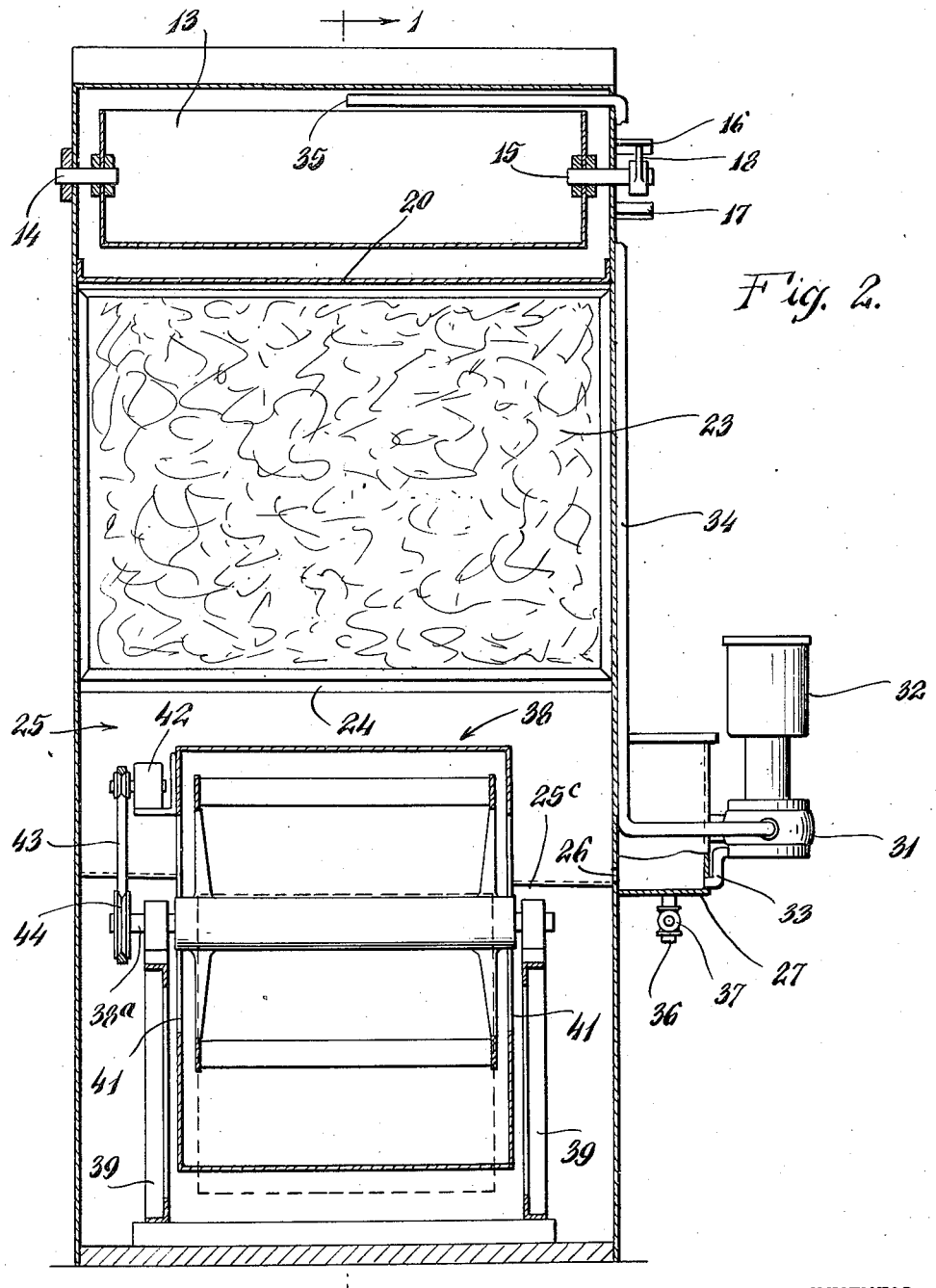
Fig. 2 is a sectional elevation taken along line 2—2 of Fig. 1.

The principles disclosed can be adapted for use with a multiple cleaning and humidifying apparatus as is illustrated diagrammatically in Fig. 4. Therein the dumping trough 13' discharges its contents to deliver the conditioning liquid to the filter screen 21'. The liquid drained therefrom and the eliminated bubbles or droplets from its eliminator screen 23' are caught on the drain pan 25'. This pan 25' is controlled by a weighted gate 50. When the liquid collected in the sump portion 25'c of the pan 25' overcomes the weight 51, the sump contents are dumped to cascade over the second filter screen 21''. The liquid drained from the latter screen and the eliminated bubbles and droplets from its eliminator screen 23'' are caught on drain pan 25''. This pan is likewise controlled by a weight operated gate 50'. When the liquid collected in sump portion 25''c of the pan 25'' overcomes weight 51', the sump contents are dumped to cascade over the next succeeding filter screen 21''' also having associated with it an eliminator screen 23'''. Ultimately the residual liquid is returned to a collecting tank for repumping to the original dump trough 13'. It will be noted that each filter screen and its associated eliminator screen forms an inverted V whose apex angle does not exceed 60°. The number of such sets of inverted V's can be as desired. The principle of operation whether a single set or multiple sets are used is the same as that described for the single set of Figs. 1–3, incl.

The apparatus described may be used directly for conditioning a room or enclosure. It may also, for example, be used in conjunction with a heating system, such as a warm air heating system, as described in my co-pending application Ser. No. 549,668. When so used, the casing 10 and its contents may be positioned adjacent to the hot air furnace. An air inlet conduit for leading air from the outside of the house is connected to the inlet 11 of casing 10. The delivery outlet 12 of the casing is connected by a conduit to the air inlet of the furnace so that conditioned air from the device of the invention is delivered to the furnace, heated therein and from the latter is delivered by conduits to the room or rooms of the house. Ordinary heating or cooling coils such as those used for hot water or steam heating can be inserted in the discharge outlet 12 from the fan and the apparatus used, therefore, for any type of heating.

While specific embodiments of the invention have been disclosed, it is to be understood that changes may be made in practice and are contemplated. The size and dimensions of the devices are not to be construed as limited to those described as they may be varied in practice to suit different operating requirements. There is no intention of limitation to the exact details shown and described.

What is claimed is:

1. In apparatus of the character described, gas cleaning and humidifying means, means for dumping a predetermined quantity of conditioning liquid, a baffle positioned to receive the initial impact of the dumped fluid and a pan serving thereafter to receive the said fluid and to deliver it at a point remote from said baffle to said gas cleaning and humidifying means, the distance between said baffle and the delivery point being admeasured so that sufficient time elapses in relationship to the viscosity of said liquid as to eliminate unevenness due to impact of the liquid on said pan and to permit said liquid to level out and flow uniformly to the said gas cleaning and humidifying means at said delivery point.

2. In apparatus of the character described, a filtering or conditioning screen, means for periodically dumping a predetermined quantity of conditioning liquid, a baffle positioned to receive the initial impact of the dumped liquid, and a pan joined to said baffle and onto which the said liquid is deflected from said baffle, said pan sloping from its junction with said baffle to a delivery point arranged over the upper edge of said screen, the said delivery point being remote from said baffle and admeasured in distance therefrom so that sufficient time elapses in relationship to the viscosity of said liquid as to eliminate unevenness caused by impact of the liquid on said pan and to permit said liquid to level out and flow uniformly to said screen at said delivery point.

3. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a plate member onto which the prescribed amount of solution in said trough is dumped periodically with each tilting of said trough, a filtering screen positioned within said casing at an angle with the horizontal and below said plate member onto which the solution dumped onto said plate member falls, a collecting trough having a sloping bottom positioned below said screen to catch the portions of the solution falling from said screen, an eliminating screen positioned within said casing at an angle to said filtering screen and below said plate member, and means to return such solution portions from said collecting trough to said tank, said float being positioned to operate said valve to cutoff at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, and a fan within said casing for drawing the fluid to be conditioned through said inlet and through said filtering screen and for thereafter blowing the conditioned fluid outwardly through said casing outlet.

4. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a plate member onto which the prescribed amount of solution in said trough is dumped periodically with each tilting of said trough, a filtering screen positioned within said casing below said plate member onto which the solution dumped onto said plate member falls, a collecting trough positioned below said screen to catch the portions of the solution falling from said screen, an eliminating screen positioned within said casing at an angle to said filtering screen and below said plate member, and means to return such solution portions from said collecting trough to said tank, said float being positioned to operate said valve to cut-off at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, a fan within said casing for drawing the fluid to be conditioned through said inlet and through said filtering screen and for thereafter blowing the conditioned fluid outwardly through said casing outlet, and said tank having a capacity which is approximately 25% in excess of the required volume of said glycol-water containing solution for wintertime air conditioning.

5. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a plate member onto which the prescribed amount of solution in said trough is dumped periodically with each tilting of said trough, a filtering screen positioned within said casing below said plate member onto which the solution dumped onto said plate member falls, a collecting trough positioned below said screen to catch the portions of the solution falling from said screen, an eliminator screen positioned within said casing at an angle not exceeding 60° with said filtering screen to form an inverted V construction and below said plate member, and means to return such solution portions from said collecting trough to said tank, said float being positioned to operate said valve to cut-off at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, a fan within said casing for drawing the fluid to be conditioned through said inlet and through said filtering screen and for thereafter blowing the conditioned fluid outwardly through said casing outlet, and said tank having a capacity which is substantially greater than the volume of said glycol-water containing solution required for wintertime air conditioning to prevent loss of solution by overflow from the tank whenever operation of the device is continued in milder seasons of the year.

6. Apparatus for conditioning a gaseous fluid such as air under wintertime conditions in an enclosure wherein the fluid is largely recirculated to a prescribed humidity and for cleaning thereof, comprising a casing having an inlet for such fluid in its top and an outlet for the conditioned fluid in one of its sides in a lower portion thereof, a tank for a glycol-water containing solution of desired concentration supported by said casing, a conduit for connecting said tank to a source of water supply, a float-operated valve in said conduit, a float for operating said valve, a tiltable trough positioned in said casing above the level of said tank and adapted to tilt to a dumping position under the weight of a prescribed amount of said solution delivered thereto, means for pumping said solution from said tank to said trough, a plate member onto which the prescribed amount of solution in said trough is dumped periodically with each tilting of said trough, a filtering screen positioned within said casing below said plate member onto which the solution dumped onto said plate member falls, a collecting trough positioned below said screen to catch the portions of the solution falling from said screen, an eliminator screen positioned within said casing at an angle not exceeding 60° with said filtering screen to form an inverted V construction and below said plate member, and means to return such solution portions from said collecting trough to said tank, said float being positioned to operate said valve to cut-off at the level of the remainder of initial solution in said tank just after the first prescribed dumping amount has been pumped therefrom to said dumping trough, and to permit said valve to open whenever the solution in said tank is below such level whereby replenishment of water evaporated from the solution in its travel from dumping trough back to said tank will be effected to restore the desired glycol-water solution concentration, and a fan within said casing for drawing the fluid to be conditioned through said inlet and through said filtering screen and for thereafter blowing the conditioned fluid outwardly through said casing outlet.

WALTER L. FLEISHER.

REFERENCES CITED

The following references are of record in the file of this patent:

UNITED STATES PATENTS

| Number | Name | Date |
| --- | --- | --- |
| 494,264 | Seymour, Jr. | Mar. 28, 1893 |
| 1,042,864 | Winks | Oct. 29, 1912 |
| 1,988,262 | Burekhalter et al. | Jan. 15, 1935 |
| 2,137,905 | Church et al. | Nov. 22, 1938 |
| 2,197,004 | Meyers | Apr. 16, 1940 |
| 2,356,757 | Fleisher | Aug. 29, 1944 |